United States Patent [19]

Fortmann et al.

[11] Patent Number: 4,891,498
[45] Date of Patent: Jan. 2, 1990

[54] FOOD TREATMENT CABINET WITH FLASH STEAMER

[75] Inventors: Robert C. Fortmann, Mundelein; Curtis C. Pinnow, Libertyville, both of Ill.

[73] Assignee: Carter-Hoffman Corporation, Mundelein, Ill.

[21] Appl. No.: 326,690

[22] Filed: Mar. 21, 1989

Related U.S. Application Data

[63] Continuation-in-part of Ser. No. 126,248, Nov. 27, 1987, Pat. No. 4,835,368.

[51] Int. Cl.$^4$ .............................. F27D 7/02; F24C 7/06
[52] U.S. Cl. ..................................... 219/401; 126/20
[58] Field of Search ............................ 219/271–276, 219/401; 126/369, 369.1, 369.2, 20, 20.1, 20.2

[56] References Cited

U.S. PATENT DOCUMENTS

| | | | |
|---|---|---|---|
| 2,674,935 | 4/1954 | Lewis et al. | 99/234 |
| 2,718,842 | 9/1955 | Klemm | 126/369 |
| 3,077,530 | 2/1963 | Chase et al. | |
| 3,236,172 | 2/1966 | Haedike | 126/20 |
| 3,744,474 | 7/1973 | Shaw | 126/20 |
| 4,722,268 | 2/1988 | Rightley | 99/468 |

Primary Examiner—Teresa J. Walberg
Attorney, Agent, or Firm—Wood, Dalton, Phillips, Mason & Rowe

[57] ABSTRACT

A food treatment/holding apparatus has a cabinet defining a storage space for food to be treated, a heater with a surface that can be heated above the boiling temperature of water, and structure for delivering a plurality of preselected amounts of water against the heater surface according to the length of time a cabinet door is opened.

18 Claims, 2 Drawing Sheets

FOOD TREATMENT CABINET WITH FLASH STEAMER

BACKGROUND OF THE INVENTION

1. Cross Reference

This application is a continuation-in-part of copending Fortmann et al. application, ser. no. 126,248, filed Nov. 27, 1987, now U.S. Pat. No. 4,835,368 owned by the assignee of the present invention, and the specification of which is hereby incorporated by reference herein.

2. Field of the Invention

It is the principal objective of restaurateurs and fast food operators to provide to their customers food items that have a fresh-cooked taste. In high volume establishments cooking on a per order basis is impossible. Instead, food items are generally precooked and placed in a heated food treatment cabinet.

Designers of food treatment cabinets strive to maintain, as long as possible, the temperature, appearance, taste, texture, and aroma of precooked food items. This objective often competes with the need to eliminate food-borne bacteria. If the cooking space in the cabinet is maintained at temperatures in excess of 140° F., most of the bacteria is killed. However, at these elevated temperatures the foods my be further cooked, which is undesirable, and/or may dry out. The result is that generally restaurateurs and fast food operators permit only a very limited storage time for precooked items, after which the items are disposed of. Profits in such operations are thus increased by lengthening permissible storage time for food in the treatment cabinet.

One attempt to preserve the just-cooked taste of foods has been to humidify the food storage space within the cabinet. Generally, a pan of water is provided in the bottom of the food storage space and heated above the boiling point of the water so that there is a progressive buildup of humidity within the food space. While the infusion of steam in food treatment cabinets has resulted in a considerable improvement over dry cabinets. The uncontrolled humidity tends to continuously cook the food items, and may also cause saturation of the food items with water so that they are not of the same quality as they were upon being introduced to the cabinet.

The Fortmann et al. application, incorporated by reference herein, discloses a food treatment/holding apparatus which delivers a metered amount of water at preselected intervals against a heater surface to produce water vapor in a food storage space. Also, an interval reset switch is disclosed which is operable upon a door being moved from its closed to its open position. When the reset switch is operated, a pulse of water is released to replenish the vapor within the space that may have been lost to the atmosphere upon the door being opened.

One problem with such a food treatment cabinet results from the fact that the amount of humidity which is released is dependent upon the length of time which the door is opened. Thus, sufficient humidity may not be replenished to maintain the desired steaming of the food items stored therein.

The present invention is intended to overcome one or more of the problems as set forth above.

SUMMARY OF THE INVENTION

In accordance with the present invention, a food treating/holding apparatus is provided with means for providing variable amounts of flash steaming according to the length of time a cabinet door is in the open position.

According to the invention, a food treating/holding apparatus is provided having a cabinet defining a storage space for food to be treated and an access opening to permit placement of food items in and the removal of food items from said storage space and a door mounted for selective movement between a closed position wherein the access opening is covered and an open position. Means are provided for sensing when the door is in the open position. A heater has a surface that can be heated to a sufficiently high temperature to vaporize water in the storage space. Means are provided for intermittently delivering water against the heater surface to produce water vapor in the food storage space. A control means is provided coupled to the sensing means and the delivering means for controlling the delivering means to deliver an amount of water according to the amount of time which the door is in the open position.

With the above structure, the food items are exposed to humid air so that the appearance, taste, texture and aroma of the food items are maintained. However, vapor is not continuously produced, as in the aforementioned prior art structures, so that the problem of saturation of food items is obviated. Moreover, the problem of replenishing vapor lost when the door is open is solved by providing an amount of water according to the time which the door is in an open position.

It is another feature of the invention to provide means for pulsing water against the heater surface at time intervals when the door is maintained in the closed position.

It is yet another feature of the invention to provide means for inhibiting operation of the control means until the temperature in the storage space has been elevated sufficiently to warm any food items stored therein.

In a preferred form, the heater surface is disposed at the bottom of a reservoir in a bottom wall of the cabinet. The temperature of the heater surface is controlled so that the pulsed water is flashed to steam immediately upon encountering the heater surface.

A first thermostat is provided to prevent delivery of water to the heater surface until the heater surface has achieved the minimum temperature necessary to permit flash steaming. A second thermostat is provided to control the temperature of the heater at a level just slightly higher than the minimum necessary for flash steaming. Accordingly, the cabinet's temperature performance is improved and heat rise due to the flash steam heater is minimized.

The heater may take a number of forms. For example, cast heaters, tubular heater elements and silicon pad heaters may be used.

DETAILED DESCRIPTION OF THE DRAWINGS

Figure 1:
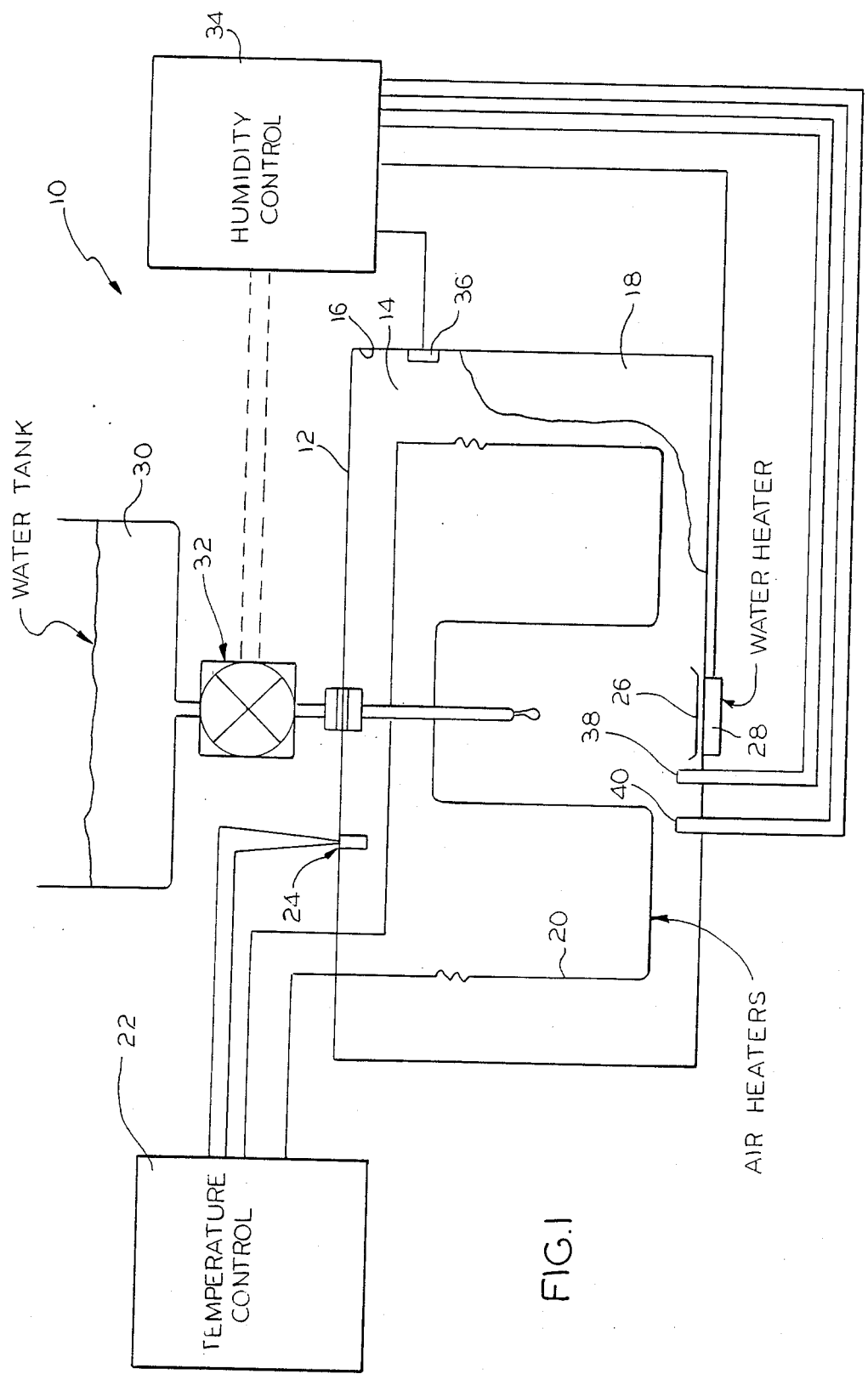
FIG. 1 is a combined diagrammatic illustration block diagram of a flash steamer incorporating the humidity control of the present invention.

With reference to FIG. 1, a food treating/holding apparatus 10 according to the invention consists of a generally square-shaped cabinet, generally indicated at 12, defining an internal space 14 for the storage of food to be treated. The cabinet 12 includes a generally rectangular access opening 16 through which access can be gained to the food treatment space 14. A door 18, matched to the configuration of the opening 16, is hingedly attached to the cabinets 12 for pivoting movement between a closed position and an open position, as is well known.

Although a detailed description of the structure of the cabinets 12 is not provided herein, reference may be had to the Fortmann et al. copending application incorporated by reference herein for details of a typical such cabinet. Nevertheless, the flash steamer control according to the invention could be provided in a variety of different cabinet structure, as is obvious to those skilled in the art.

The space 14 is heated by a conventional tubular heater element 20 supported in the cabinet 12 by any known means. The amount of heat developed by the element 20 can be selectively controlled utilizing a temperature control 22. A temperature probe 24 senses the temperature in the space 14 and feeds back a signal to the control 22 so that the preselected temperature is maintained in the space 14.

Humidity is developed within the cabinet space 14 at a reservoir 26 in the bottom of the cabinet 12. A cast heater 28, of conventional construction, is fixed to the cabinet 12 by any known means, as described in the copending application, in heat exchange relationship with the reservoir 26. The cast heater 28 shown is only exemplary of a number of heaters that can be used. For example, a silicon pad heater or tubular heater element as used in ovens can be substituted. The type of heater chosen must have a capacity to heat the reservoir 26 sufficiently to the boiling temperature of water. Once the reservoir is suitably heated, water from a storage tank 30, secured to the cabinet as described in the copending application, is delivered controllably through a solenoid valve 32 against the reservoir 26 and is immediately flashed to steam, which diffuses throughout the space 14. Water is supplied to the tank 30 from any conventional, pressurized supply (not shown).

According to the invention, the water is released for delivery against the reservoir 26 by a humidity control 34. The humidity control also controls energization of the cast heater 28. A door sensor, such as a limit switch, 36 is coupled to the humidity control 34 and is operable to sense when the door 18 is in the open or closed position.

If the temperature of the reservoir 26 is below the boiling temperature of water, then the incoming water will flood the reservoir 26. This increases the time it takes to elevate the temperature of the reservoir to the boiling point of water and additionally eliminates any control that the user has over the humidity, which is continuously developed in the reservoir 26 until the majority of the water evaporates. If the surface of the reservoir 26 is above a predetermined temperature, then the water tends to spatter and as a result, is not thoroughly vaporized. To prevent either of these conditions from occurring, first and second temperature probes 38 and 40 are provided. The probes 38 and 40 are coupled to the humidity control 34. As described in greater detail below, upon the first thermostat probe 38 detecting a temperature insufficient to flash water to steam, the solenoid valve 32 is controlled to prevent release of water thereby to the reservoir 26. The second probe 40 prevents operation of the cast heater 28 upon detecting a temperature of the reservoir 26 above a predetermined temperature.

Figure 2:
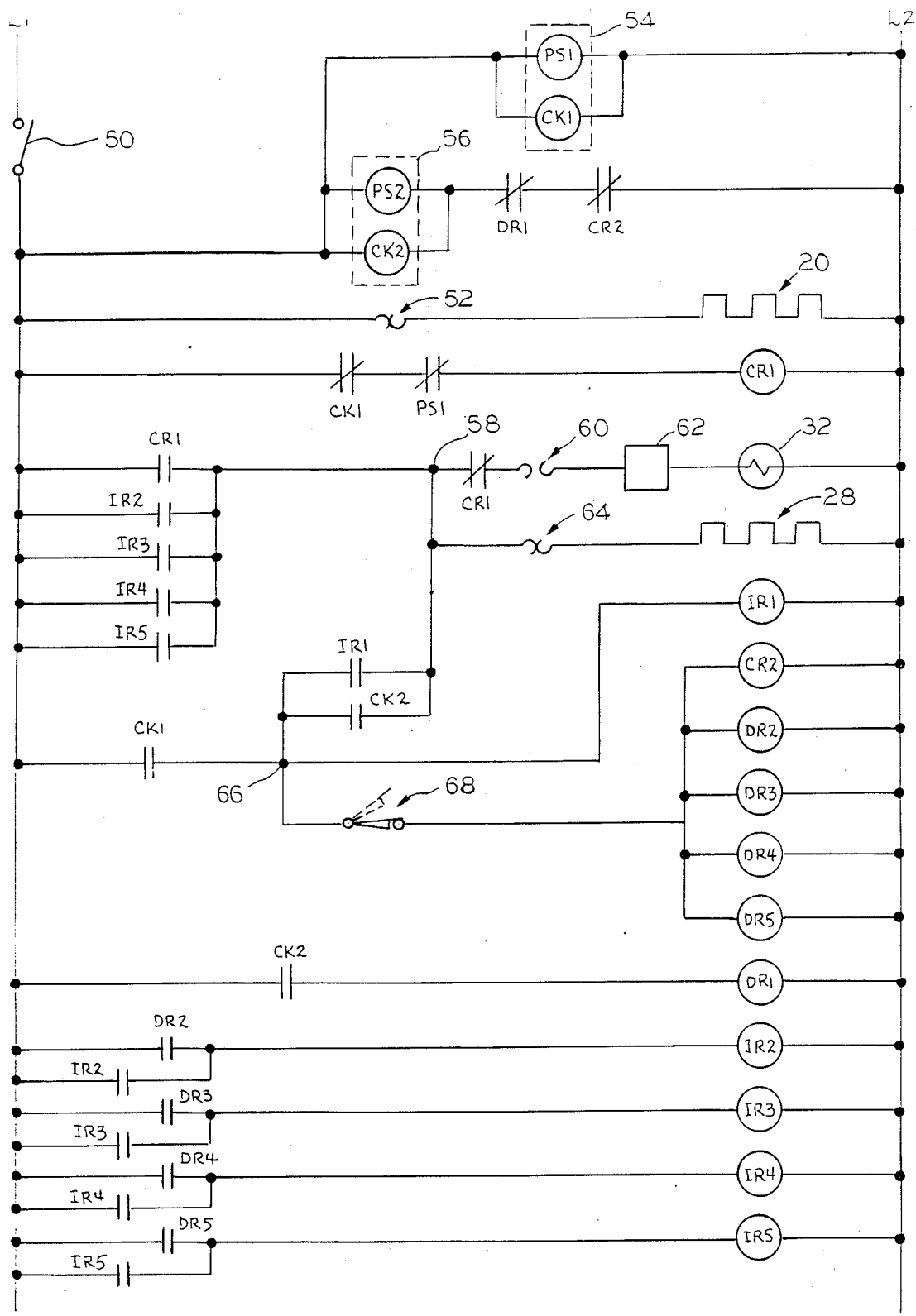
FIG. 2 is a ladder diagram illustration for the humidity and temperature control of the cabinet of FIG. 1.

With reference to FIG. 2, a ladder diagram represents a circuit for implementing the temperature control 22 and the humidity control 34 of FIG. 1.

Power, such as for example 120 volt AC power, is provided from any known power source (not shown) to power rails L1 and L2. A power, or on/off, switch 50 is connected in the L1 rail to provide power to the system only when the switch 50 is in the on position, as is well known. For the implementation of the temperature control 22, a normally controlled thermostat switch 52, associated with the probe 24, see FIG. 1, is coupled in series with the air heater element 20 between the rails L1 and L2. Accordingly, with the switch 50 in the on position, the heater 20 is energized as long as the temperature sensed by the probe 24 is below a preselected temperature on the order of, for example, 155° F. If the temperature in the storage space 14 is elevated above this preselected temperature, then the thermostat switch 52 opens to deenergize the heater 20, as is well known.

The remainder of the ladder diagram relates to the humidity control 34.

Accordingly to the illustrative embodiment, the humidity control 34 is implemented utilizing control relays responsive to the sensing devices for controlling humidity in the cabinet 12. Alternatively, the humidity control according to the invention could be implemented utilizing analog or digital electronic circuits, or a programmed CPU.

A first timer 54 is connected between the rails L1 and L2. The first timer 54 may be, for example, a series 365 long-range computing timer as manufactured by Automatic Timing and Controls Company. The first timer 54 includes a power supply relay PS1 and a clock relay CK1 each having a respective coil connected in parallel. A second timer 56, similar to the first timer 54, and including a power supply relay PS2 and a clock relay CK2 each having a coil connected at one side to the rail L1. The other side of the coils for the relays PS2 and CK2 are connected through normally closed relay contacts DR1 and CR2, described below, to the other rail L2.

The first timer 54 is used as a preheat timer and is operable to inhibit pulsing of water for a preselected minimum period of time, such as, for example, twenty-five minutes, to allow sufficient time for the air heater 20 and the cast heater 28 to elevate to their desired temperatures. The second timer 56 is used to deliver metered amounts of water at preselected intervals under normal operating conditions after the preheat time has ended, as discussed more specifically below.

Each of the power supply relays PS1 and PS2 operate their associated contacts instantly upon energization. The clock relays CK1 and CK2, however, are used for providing an on-delay operation, and actuate their associated contacts after a preselected delay period.

A normally closed contact associated with the clock relay CK1 is coupled in series with a normally open contact of the first power supply relay PSI and a coil of a first control relay CR1, between the rails L1 and L2.

A normally open contact associated with the first control relay CR1 is coupled at one side of the rail L1 and at its other side to a node 58. Series coupled between the node 58 and the second rail L2 are a normally closed contact associated with the first control relay CR1, a normally open thermostat switch 60 associated with the third probe 40, see FIG. 1, a cube timer 62, and the solenoid valve 32, see FIG. 1. Also series connected between the node 5 and the second rail L2 are a normally closed thermostat switch 64 associated with the second probe 38, see FIG. 1, and the cast heater 28.

A normally open contact associated with the first clock relay CK1 is connected between the first rail L1 and a second node 66. Connected between the second node 66 and the second rail L2 is a coil of a first interval relay IR1. The interval relay IR1 is operable upon application of a voltage across its coil to immediately actuate its associated contacts and to begin a time delay period. At the completion of the time delay period, the contacts return to their normal unactuated state until the voltage is removed from the coil and subsequently reapplied. A normally open contact associated with the first interval relay IR1 is connected in parallel with a normally open contact associated with the second clock relay CK2 between the nodes 66 and 58.

A normally open contact associated with the second clock relay CK2 is coupled in series with a coil for a first delay relay DR1 between the rails L1 and L2. The delay relay is operable upon application of a voltage across the coil to commence a time delay period. At the end of the time delay period, then any contacts associated with the delay relay coil are actuated until the voltage is removed from the coil, which also serves to reset the timer.

A normally closed limit switch contact 68 associated with the door sensor 36 is connected at one side to the node 66. Parallel connected between the other side of the limit switch 68 and the second rail L2 are coils for a second control relay CR2, and second through fifth delay relays DR2-DR5. The delay relays DR2-DR5 are similar in operation to the first delay relay DR1. The limit switch 68 contact is closed, indicated in solid line, when the door 18 is in an open position, and is open, indicated in dashed lines, when the door 18 is in the closed position. A normally open contact associated with each of the second through fifth delay relays DR2-DR5 are connected in series with coils of second through fifth interval relays IR2-IR5, respectively, between the rails L1 and L2. The interval relays IR2-IR5 are similar to the interval relay discussed above. A normally open hold-in contact associated with each interval relay IR2-IR5 is connected in parallel with the respective contact normally open contacts of the delay relays DR2-DR5. For example, normally open contacts for the second delay relay DR2 and the second interval relay IR2 are parallel connected with one another and in series with the coil of the second interval relay IR2.

A normally open contact associated with each of the second through fifth interval relays IR2-IR5 are parallel connected between the first rail L1 and the first node 58.

The timing period for each of the delay relays and the interval relays are adjustable and are preselected to maintain a desired humidity level in the cabinet 12. Particularly, according to the illustrative embodiment, the delays associated with the delay type relays are as follows:

| Relay | Delay Time |
| --- | --- |
| CK1 | 25 minutes |
| CK2 | 5 minutes |
| DR1 | 2 seconds |
| DR2 | .7 seconds |
| DR3 | 4 seconds |
| DR4 | 13 seconds |
| DR5 | 44 seconds |

Particularly, as discussed above, the first clock relay CK1 provides an initial preheat time, while the second clock relay CK2 provides an intermittent flash of steam at preselected intervals, determined by the delay time, after the preheat time is ended. The first delay relay DR1 is used to determine the amount of water delivered at the preselected intervals and to reset the second clock relay CK2. The second, third, fourth and fifth delay relays DR2-DR5 are used to sense door open time and provide four increments of humidity level according to the length of time the door is opened, as discussed more particularly below, The first interval relay IR1 is used to provide an initial flash of steam at the completion of the preheat time for a length of time determined its delay time. The second through fifth interval IR2-IR5 are utilized to determine the amount of time that flash steaming is provided in accordance with the length of time the door is opened as determined by the delay relays DR2-DR5. According to the illustrative embodiment, the time periods are set as follows:

| Coil | Delay Time |
| --- | --- |
| IR1 | 4 seconds |
| IR2 | 10 seconds |
| IR3 | 15 seconds |
| IR4 | 30 seconds |
| IR5 | 26 seconds |

The above-listed time periods are empirically determined and may be adjusted as necessary or desired to satisfy humidity requirements. Also, additional delay relays and interval relays could be included to provide more than four increments of humidity level control, as is obvious.

Operation of the humidity control 34 and temperature control 22 are now described assuming the system begins from a cold start when the power switch 50 is turned to the on position. The coils for both power supply relays PS1 and PS2 and clock relays CK1 and CK2 are energized and the preheat time period begins. Also, the air heater 20 is instantly energized and is continually controlled by the thermostat switch 52 throughout the entire range of operation to maintain the air space at the preselected desired temperature.

The coil for the first control relay CR1 is energized since the normally open contact associated with the first power supply relay PS1 is closed, while the normally closed contact associated with the first clock relay CK1 remains in its normal state. With the first control relay CR1 energized, its associated normally open contact is closed and the node 58 is shorted directly to the first rail L1. Accordingly, the cast heater 28 is energized and controlled by its associated normally closed thermostat switch 64 to preheat the reservoir 26. However, operation of the solenoid valve 32 is inhibited since the normally closed contact associated with the first control relay CR1 is open. Although the second timer 56 is operational, it is non-functional during the preheat time.

At the completion of the twenty-five minute preheat time, the contacts associated with the first clock relay CK1 change state. Accordingly, the first control relay CR1 is deenergized and the node 66 is shorted directly to the first rail L1. Also, the cast heater 28 is deenergized and operation of the solenoid valve 32 is no longer inhibited since the CR1 normally closed contact returns to its closed state. Thereafter, the solenoid valve 32 and the cast heater 28 are only energized when it is necessary to add steam, as discussed below.

After the completion of the preheat time, steam is added under three distinct operating conditions. Particularly, an initial dose of steam is added and thereafter steam is added every five minutes or any time the door is moved from the closed position to the open position.

Specifically, subsequent to the end of the preheat time, in order to add steam it is necessary to short the node 58 directly to the rail L1. Upon shorting the node 58 to the rail L1, the cast heater 28 is instantaneously energized and it is controlled by the thermostat switch 64 to elevate the temperature of the reservoir 26 to provide flash steaming. Also, the solenoid valve 32 is operable. However, no water is released to the reservoir 26 until the temperature at the reservoir is above the preselected boiling point temperature as determined by the probe 40 and its associated normally open thermostat switch 60. When the temperature of the reservoir 26 has reached a sufficient elevation, then the solenoid valve 32 is energized by the cube timer 62. Particularly, the cube timer 62 is operable to provide a repeat cycle pulse to the solenoid 32 to control the flow rate of water from the water tank 30 to the reservoir 26. For example, the cube timer 62 may provide a pulse of 0.10 seconds duration every three to four seconds. Both the delay period and duration period are adjustable, as is well known.

The initial flash of steam is provided when the normally open contact associated with the first clock relay CK1 closes at the end of the preheat time. This shorts the node 66 to the first rail L1 to energize the coil of the first interval relay IR1. Accordingly, its associated normally open contact shorts the first node 58 to the second node 66, which effectively shorts the first node 58 to the first rail L1 to provide a flash of steam, as discussed above for the delay period of the first interval relay, i.e., four seconds in the illustrative embodiment.

The second humidity control cycle comprises the intermittent control which is controlled by the second clock relay CK2. Specifically, in the illustrative embodiment, and assuming that the door 18 remains in the closed position, after five minutes the second clock relay CK2 times out causing its associated normally open contact between the nodes 66 and 58 to close to provide for delivering of a metered amount of water according to the time period of the first delay relay DR1. Specifically, the coil for the first delay relay DR1 is energized at the beginning of the humidity application time and after its time period of four seconds, then its associated normally closed contact opens causing the second timer 56 to be deenergized to complete the cycle. Deenergizing the second timer 56 causes the first delay relay DR1 to deenergize and reset the second timer 56 so that another five minute cycle begins.

At any time that the door 18 is opened, the door sensor limit switch 68 moves from the open position to the closed position. Resultantly, the second control relay CR2 and the second through fifth delay relays DR2-DR5 are all energized. Energizing the second control relay CR2 causes the second timer 56 to reset. Also, each of the delay relays DR2-DR5 begin their time periods. As indicated above, the delay periods for the delay relays DR2-DR5 are of successively longer increments. After the door 18 has been open for 0.7 seconds, then the normally open contact associated with the second delay relay DR2 closes causing the second interval relay IR2 to be energized. The hold-in contact for the second interval relay IR2 maintains it in its energized state while its other associated normally open contact shorts the node 58 directly to the first rail L1 for ten seconds. Thus, the flash steam operation is enabled for ten seconds. However, as is apparent, steam is not added for the full ten seconds as time must be allotted for enabling the reservoir temperature to rise. At the end of ten seconds, both contacts associated with the second interval relay IR2 ar opened and the flash steaming operation ends. However, if the door 18 remained open for four seconds, then the third delay relay DR3 times out causing the third interval relay IR3 to be energized so that flash steaming is provided for fifteen seconds instead of ten seconds. Similarly, if the door remains open for thirteen seconds, then the fourth delay relay DR4 times out, and flash steam is added for thirty seconds, and if the door remains open for forty-four seconds, then the fifth delay relay DR5 times out and the fifth interval relay IR5 is energized to provide flash steam for twenty-six seconds.

Thus, the longer the door 18 is held open, the more water is added to the flash steamer to replenish the humidity. Once the door 18 is again closed, then the second control relay CR2 deenergizes and the second timer 5 is again energized to provide for the normal intermittent delivering of water at the controlled five minute intervals.

Although the circuit disclosed herein includes delay relays and interval relays which have adjustable preselected time periods, means could be provided for enabling a user to easily adjust such delay times automatically utilizing a conventional control mounted externally of the cabinet 12, as is obvious.

Thus, the invention broadly comprehends a control for a food treating/holding apparatus which provides flash steam for a period of time associated with the amount of time that the cabinet door is an open position.

Furthermore, a food treating/holding apparatus is provided which controls humidity based on empirical data, rather than requiring the use of a humidity sensor.

WE CLAIM:

1. A food treating/holding apparatus comprising:
   a cabinet defining a storage space for food to be treated, said cabinet having an access opening to permit placement of food items in and removal of food items from said storage space and a door mounted for selective movement between a closed position wherein the access opening is covered and an opened position;
   means for sensing if the door is in the open position;
   a heater having a surface that can be heated to a sufficiently high temperature to vaporize water in said storage space;
   means for delivering water against the heater surface to provide water vapor in said storage space; and
   control means coupled to said sensing and said delivering means for causing said delivering means to deliver a preselected metered quantity of water to the heater surface according to an amount of time that said door is in said open position to compensate for humidity loss to the atmosphere upon said door being opened.

2. The food treating/holding apparatus according to the claim 1 further including temperature sensing means for preventing operation of said heater when said heater surface is above a preselected temperature.

3. The food treating/holding apparatus according to claim 1 wherein a heater element is provided to heat air in said food storage space.

4. The food treating/holding apparatus according to claim 1 further including temperature sensing means for preventing delivery of water against said heater surface by said water delivery means when said heater surface is below a preselected temperature.

5. The food treating/holding apparatus according to claim 1 wherein said control means includes first timer means for determining a time related to the length of time said door is in the open position, and second timer means for causing said delivering means to deliver water for a preselected time period according to the time measured by said first timer means.

6. The food treating/holding apparatus according to claim 5 wherein said first and second timer means provide four increments of humidity control.

7. The food treating/holding apparatus according to claim 1 further comprising means for inhibiting the delivering of water by said delivering means when said apparatus is first placed in an on state.

8. The food treating/holding apparatus according to claim 7 wherein said inhibiting means includes means for inhibiting operation for a preselected minimum period of time.

9. The food treating/holding apparatus according to claim 1 further comprising means responsive to said door being in the closed position for intermittently delivering a metered amount of water at controlled intervals against the heater surface to produce water vapor in the food storage space.

10. A food treating/holding apparatus comprising:
a cabinet defining a storage space for food to be treated, said cabinet having an access opening to permit placement of food items in and removal of food items from said storage space and a door mounted for selective movement between a closed position wherein the access opening is covered and an opened position;
means for sensing if the door is in the open position, said sensing means including a switch which is actuated if said door is in the open position;
a heater having a surface that can be heated to a sufficiently high temperature to vaporize water in said storage space;
means for delivering water against the heater surface to provide water vapor in said storage space; and
first timer means coupled to said sensing means for determining a door open time related to the length said switch is actuated;
second timer means operatively associated with said first timer means for causing said delivering means to deliver a quantity of water to said heater surface for a length of time related to said door open time to compensate for humidity loss to the atmosphere upon said door being opened.

11. The food treating/holding apparatus according to the claim 10 further including temperature sensing means for preventing operation of said heater when said heater surface is above a preselected temperature.

12. The food treating/holding apparatus according to claim 10 wherein a heater element is provide to heat air in said food storage space.

13. The food treating/holding apparatus according to claim 10 further including temperature sensing means for preventing delivery of water against said heater surface by said water delivery means when said heater surface is below a preselected temperature.

14. The food treating/holding apparatus according to claim 10 wherein said first and second timer means provide four increments of humidity control.

15. The food treating/holding apparatus according to claim 10 further comprising means for inhibiting the delivering of water by said delivering means when said apparatus is first placed in an on state.

16. The food treating/holding apparatus according to claim 15 wherein said inhibiting means includes means for inhibiting operation for a preselected minimum period of time.

17. The food treating/holding apparatus according to claim 10 further comprising means responsive to said door being in the closed position for intermittently delivering a metered amount of water at controlled intervals against the heater surface to produce water vapor in the food storage space.

18. A food treating/holding apparatus comprising:
a cabinet defining a storage space for food to be treated, said cabinet having an access opening to permit placement of food items in and removal of food items from said storage space and a door mounted for selective movement between a closed position wherein the access opening is covered and an opened position;
means for sensing if the door is in the open position, said sensing means including a switch which is actuated if said door is in the open position;
a heater having a surface that can be heated to a sufficiently high temperature to vaporize water in said storage space;
means for delivering water against the heater surface to provide water vapor in said storage space; and
first timer means coupled to said sensing means and responsive to said switch being actuated any one of a plurality of preselected door open times for commanding delivery of water;
second timer means operatively associated with said first timer means for causing said delivering means to deliver a quantity of water to said heater surface for any one of a plurality of humidity replenishment times related to said door open time to compensate for humidity loss to the atmosphere upon said door being opened.

* * * * *